March 31, 1970  F. F. TONE  3,504,180

X-RAY FILM PACKAGE

Filed March 24, 1967

FREDERICK F. TONE
INVENTOR.

BY

ATTORNEYS

United States Patent Office 3,504,180
Patented Mar. 31, 1970

3,504,180
X-RAY FILM PACKAGE
Frederick F. Tone, Rochester, N.Y., assignor to Eastman Kodak Company, Rochester, N.Y., a corporation of New Jersey
Filed Mar. 24, 1967, Ser. No. 625,829
Int. Cl. G03b 17/26
U.S. Cl. 250—68                                    5 Claims

ABSTRACT OF THE DISCLOSURE

A package for holding X-ray films during exposure wherein the intensifying screens are pressed uniformly against the X-ray sensitive surfaces upon closing the package. The screens are mounted on opposed convexly curved panel surfaces and are pressed against the X-ray film first along one longitudinal edge of the film and progressively in increments to the opposite edge as the curved panels are pressed together to form a flat cassette.

The present invention relates to a film package and more particularly to a cassette containing an X-ray film in a manner suitable for exposure.

A great deal of work has been done in the art of film packaging for exposure purposes. Medical X-ray films present a somewhat unique problem in that to be most effective the film must be overlaid by intensifying screens. Intensifying screens fluoresce under X-ray bombardment and thus release light energy to expose adjacent film. However, if the screens are not in uniform contact with the film the fluorescing point of the screen will cause an undesirable area of confusion in the exposure on the film. Since the screens account for as much as 95% of the latent image, their behavior must be accurately controlled.

The problem is further complicated by the fact that the X-ray film itself is usually very sensitive to pressure. Excessive or localized high pressure may cause sensitization or desensitization of the film emulsion and result in a spurious image in the radiograph. Therefore, one criteria of an improved cassette is that the compressing of the X-ray film between the intensifying screens must be accomplished in a manner developing uniform yet low pressure across the entire area of the film. Additionally, it is most practicable to have cassettes which are of minimum weight for convenience of handling, and minimum X-ray absorption through the front where the X-rays enter the cassette to expose the film.

A first approximation of an ideal X-ray cassette would be to use thin flat plates supporting therebetween flat soft pads with intensifying screens on their surfaces. However, in such a construction the compression forces necessary for compressing the pads coupled with the fact that the thin plates should be of minimum weight, may result in an outward deflection of the center of the plates causing compression to vary across the film surface and causing the cassette to be unacceptably thick. Even more troublesome is the entrapment of air during cassette closure which prevents continuous contact between the film and the intensifying screens. Thus, the center area of the film has minimum contact and may have no contact against the intensifying screens while the edges have maximum compressive contact. Since the most important portion of the radiograph is most likely to be in the center area of the film, the use of such a thin flat plate construction for the cassette is not entirely satisfactory.

It appears in the prior art that a next step in developing an ideal cassette was to form thin plates having a spherical inward warp. With this construction one would assume the center of the plates to have approximately the same compression as the perimeter. However, if one observes the pressure density across a flattened region between a thin wall unpressurized sphere and a flat surface it may be seen that the pressure per unit area is not uniform because the sphere tends to invert at the center. Furthermore, fatigue of the metal plate or permanent set of the pad would result in unpredictable pressure variations.

Also, I have found that the use of one flat plate and one curved one with reasonably thin plates causes the flat one to be pushed out by the curved one to wrinkle the film and the intensifying screens therebetween because both the screens and the film tend to be forced into a non-planar, somewhat spherical configuration. When such films were developed it was found that the deforming of the screens into the somewhat spherical shape tends to wrinkle them and to provide image degradation due to lack of screen-film contact or the like in the developed radiograph. This problem becomes especially acute if an attempt is made to use sufficient spherical curvature so that the curved screen "rolls" over the film without entrapping air.

Therefore, an object of the present invention is to provide an improved X-ray film cassette.

According to one embodiment of this invention a pair of cylindrically curved resilient panels are each hinged at one of their straight elemental edges to present convex mating surfaces for compressively suporting a film sheet. Each curved plate has its inner surface covered with a uniform thickness and uniform density foam cushion, and each cushion has an inner surface comprising and intensifying screen which is "rolled" over the film during closure to prevent entrapment of air. Around the entire cassette is a light tight frame which includes hinge means and latch means so that the panels of the closed package are flat to uniformly compress all portions of the X-ray film. In this manner a most reliable and accurate X-ray image is formed.

The subject matter which is regarded as my invention is particularly pointed out and distinctly claimed in the concluding portion of this specification. The invention, however, as to its organization and operation, together with further objects and advantages, will best be understood by reference to the following description taken in connection with the accompanying drawing, in which:

Figure 1:
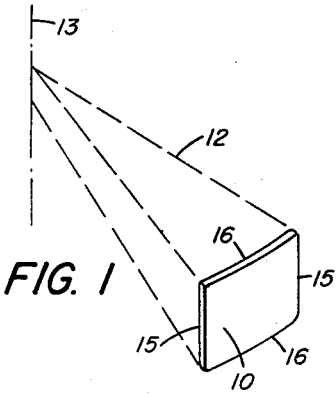
FIG. 1 is a simplified perspective view of a panel section usable with my invention.

Referring now to the drawing wherein like numbers refer to similar parts, in FIG. 1, I have shown a perspective view of a small segment of a cylinder. The surface of a panel 10 of the cylinder is curved so that when used in a cassette it will roll across the film during closing. To obtain the desired progressively rolling mating contact the radius of curvature 12 is of a length, such as 36 inches. However, the curvature may be substantially circular rather than precisely so. A plane passing through the axis 13 of the cylinder will cut straight or elemental edges of the panel 10, as indicated at 15. The panel 10 is also bounded by curved edges 16 connecting the elemental edges 15. 80-mil magnesium or 60-mil hardened aluminum make quite satisfactory resilient panels 10. However, other materials such as certain plastics which do not age rapidly will serve quite well also.

Figure 2:
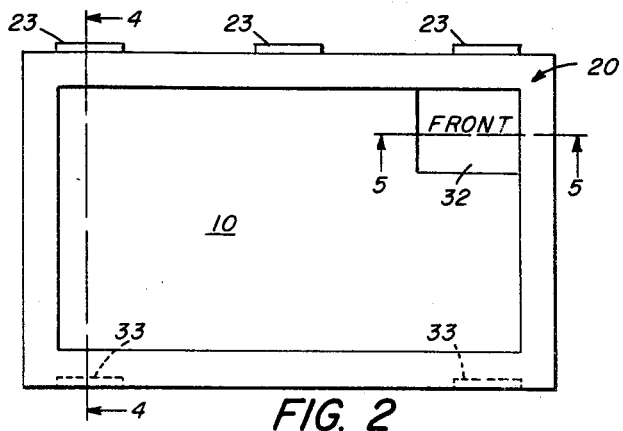
FIG. 2 is a top plan view of a cassette according to my invention.
Figure 3:
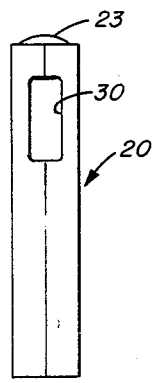
FIG. 3 is an end view of the cassette shown in FIG. 2.
Figure 4:
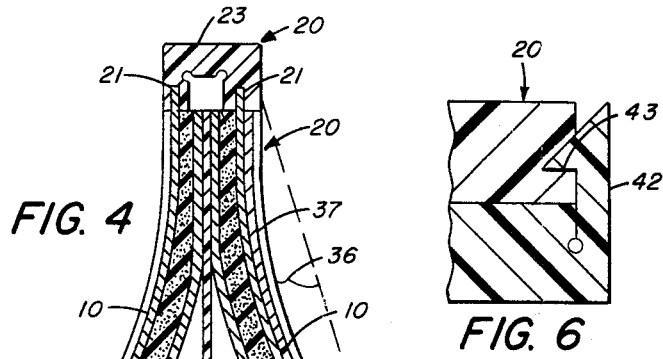
FIG. 4 is a sectional view of an open cassett taken along the line 4—4 of FIG. 2.

Referring now to FIGS. 2, 3, and 4, I have shown a film package or cassette. The curved aluminum panels 10 are shown as surrounded by a complex opaque plastic frame 20 having a groove 21 (FIG. 4) therein. The groove 21 envelops the generally rectangular perimeter of the resilient panels 10 in a light tight seal. The complex frame member 20 has hinge means 23 at one elemental edge of each of the panels 10 which is effective throughout its length to maintain the elemental edges 15 attached thereby parallel. The frame 20 or at least the hinges 23 may be made of an elastomeric material such as polyurethane, polyethylene or the like. Although three hinges are indicated in FIG. 2, a single hinge along the full length of the elemental edges will serve just as well and will simplify the problem of making the entire cassette light tight.

The edges of the aluminum plates 10 most remote from the hinges 23 are also straight elemental edges (15). The frame 20 around the panels forms a light tight seal when closed by means of a protrusion 25 which fits into a socket or groove 26. In fact, the protrusion and groove extend around the frame perimeter to the opaque hinge means 23. When plastic is used for the frame or panels, it is most practicable to fill it with any well-known opaque substance that will not contaminate film emulsion or intensifying screen materials. The latching of the cassette in a closed position is accomplished by expanded portions or tabs 28 (FIG. 4) in the protrusion 25 which are resiliently enclosed by the necked-down socket portions of the groove 26. This latch system is, in some respects, like the connecting mechanism of stringless plastic beads sometimes referred to as "pop" beads.

Also shown in FIG. 3 is a slot area 30 through which an identification tongue may be inserted to apply positive identification information on any film within the cassette. This area of identification is covered by a patch 32 having thereon the lettering "front" and preferably comprising a heavy lead foil. The lead patch will prevent the passage of X-ray energy from "fogging" or partially exposing the identification film area thereunder. Thus, the identification system is independent of the X-ray radiation as explained in greater detail in copending applications Ser. Nos. 625,765, now U.S. Patent No. 3,466,440, and 625,827, filed by Messrs. Robert F. Deprez, Robert I. Edelman and myself the same day as this case, and assigned to the assignee of the present application.

Referring now more specifically to FIG. 4, I have shown the cassette open with a film 34 placed between the curved panels 10. The film is the usual X-ray type having photosensitive emulsion on both sides which is, of course, sensitive to light. Thus the cassette would not be opened as shown in FIG. 4 except in a dark environment such as a loading room. The natural or unrestrained curvature of the panels 10 when the side 16 is about 14 inches long is such that the maximum distance between a chord 35 (dashed line) and the center of the panel is about .6 inch indicated at 36. Such a curvature will provide an effective "rolling" progressing closure action to definitely prevent entrapment of air during the closing of the cassette. When using 60-mil hardened aluminum such a bend will provide a uniform pressure of 0.1 to 0.2 p.s.i. between the film and the intensifying screens. Also FIG. 4 shows a "back up" lead foil 37 which prevents backscatter of unabsorbed X-radiation from producing a spurious image on the film. The foil 37 need not overlap the foil patch 32.

Obviously, with the latch mechanism illustrated in FIG. 4, some type of unlatching system must be used. For this purpose, I prefer to use an edge slot 33 (FIG. 4) as indicated in dashed lines in FIG. 2. Rather simple angle irons or hooks (not shown) can easily reach into the slots 33 to open the frame 20 and release the film 34.

Figure 5:
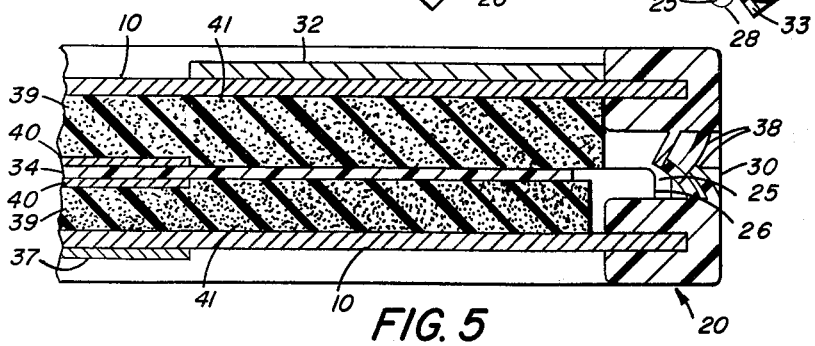
FIG. 5 is a sectional view taken along the line 5—5 of FIG. 2.

Referring now to the sectional view of FIG. 5, the tongue insertion area slot 30 is shown in greater detail. The frame 20 in the slot area is provided with overlapping resilient flaps 38 which interlock upon one another when the identification tongue is not therebetween, and press against the tongue to prevent light leaks therearound when a tongue is present.

As shown in the sectional views of FIGS. 4 and 5 the panels 10 have secured to the inner surfaces thereof foam pads 39 which resiliently support intensifying screens 40. Although it is not essential that the padding be balanced, a usual practice is to provide two screens, one glued to each pad. In certain circumstances one screen would be quite effective, particularly with a film having an emulsion on only one side. The screens 40 are of the type that X-rays cause to fluoresce and expose film substantially more than the X-rays do themselves. With the cylindrical curvature of the panels 10, the screens are pressed against the X-ray film 34 in a rolling engagement when the cassette is closed so that no air is entrapped therebetween.

For the purposes of clarity I shall refer to a panel unit as comprising at least a panel 10, a foam pad 39, a screen 40, and a frame 20.

FIG. 4 shows that the particular pad system used contemplates compression of the pads about 50%. The precise amount of compression is not critical because the pad system is selected to have a steady midrange modulus of elasticity when compressed more than about 20% and less than about 80% to obtain a uniform pressure. Outside this range the pad pressure is likely to be unsuitable; at 0–20% being too low initially and 80–100% being too high in the final stages of compression. A preferred foam material has a steady midrange modulus of elasticity of about 0.1 to 0.2 p.s.i. One material that will provide characteristics in this range is polyether foam of 1 to 1.2 pounds per cubic foot density when sliced to thicknesses of about ¼ inch to ½ inch. Such a thickness is included hereinafter in the range of the order of 0.3 inch. When the intensifying screens are omitted as in the identification area, the foam pads 41 may be made slightly thicker to correspond to those at 39. Also, for hand loaded cassettes it is sometimes preferred to have one side of the cassette dished out so that the film may be set therein. In such a case the thinner pad might be as thin as ⅟₁₆ inch. When the panel (10) initially cylindrically curved, is deflected into a flat or planar condition, a uniform pressure is developed between both sides of the film 34 and the intensifying screens 40, when the cassette is closed. This uniform pressure has a predictable relation to the resiliency of the panel 10 and its curvature, and the resilience and thickness of foam pads 41. Since the panels 10 are made of a uniform thickness resilient material, this uniform pressure is developed along the entire surface of the X-ray film 34 when the panels are flat against it. Also, since the resilient aluminum panels 10 are not stressed to a magnitude near that which will permanently deform the curvature thereof, this pressure will remain fixed despite continued long term use of the cassette.

Figure 6:
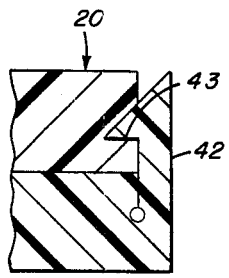
FIG. 6 is a sectional view of another embodiment to illustrate a compatible latch mechanism.

Referring now to FIG. 6, I have shown another latch means wherein the lower portion of the frame 20 is provided with an upwardly extended resilient, deformable hook 42. The upper frame member is provided with a notch 43. Thus to latch the cassette the upper panel is merely pressed against the lower panel. To release the latch no slots 33 are required. The release is accomplished simply by bending the latch 42 so that it releases the notch 43. Other "hooking" latches may be envisioned which will provide a light tight seal.

While I have shown particular embodiments of this invention, other modifications thereof will occur to those skilled in this art. For instance, the foam pads may be made slightly thicker in the region centered between the elemental edges 15 so that the panels 10 cylindrically bow or bend outward slightly to reach their equilibrium position. Such a system may also provide a uniform pressure of about 0.15 p.s.i. at the film surface. With this construction, the frame 20 and groove 21 in the region of the curved edges 16 should provide a slight reverse bend to compensate for a tendency for light leaks because of the added foam pillow in the center. Although this system might prove slightly harder to design, uniform pressure and a rolling closure action can be obtained. With the rolling closure, the entrapment of air is prevented so that the film is not separated from the intensifiers. It will become apparent to those most familiar with resiliency that the present invention is a most, if not the only, practicable way to combine (a) inherent uniform pressure, (b) lightweight package, and (c) minimum thickness.

The invention has been described in detail with particular reference to preferred embodiments thereof, but it will be understood that variations and modifications can be effected within the spirit and scope of the invention as described hereinabove and as defined in the appended claims.

I claim:
1. An X-ray film cassette for supporting sheet film during exposure to radiation, said cassette comprising:
   a pair of substantially similar flexible panels, each respectively defining an arcuate portion of a convex cylindrical surface, and each having respectively first and second parallel straight edges, at least one of said panels being transparent to such radiation;
   compressible pad means secured respectively to said surfaces of said panels;
   a pair of intensifying screens secured respectively to said pad means of each of said panels such that each of said screens respectively define an arcuate portion of a cylindrical surface;
   hinge means positioned at the first straight edges of each of said panels respectively for hingedly coupling said panels together;
   said panels so positioned with respect to one another that when said cassette is opened the convex cylindrical surfaces generally face each other and when said cassette is closed said intensifying screens are rolled over a film in said cassette as said panels are flexed from said first edges to said second edges to bring said panels and said intensifying screens into a flat mating relationship while preventing air entrapment and when said panels and said intensifying screens are in said flat mating relationship said pad means are compressed such that the film in said cassette is contacted and compressed uniformly on both surfaces by said intensifying screens; and
   means positioned on the second straight edges of said panels for releasably coupling said panels into said flat mating relationship.

2. The invention according to claim 1 wherein said compressible pad means is a foam material having a steady midrange modulus of elasticity of about 0.1 to about 0.2 p.s.i. and wherein when said panels are in said flat mating relationship, said foam is compressed from between about 20 percent to about 80 percent.

3. The invention according to claim 1 further comprising a pair of frames positioned adjacent the periphery of each of said panels respectively, the frame of one of said panels defining a groove positioned adjacent the edge portions thereof, the frame of the other of said panels having a protrusion positioned adjacent the edge portions thereof for insertion into the groove of the one of said panels to form a light lock when said panels are held in said flat mating relationship.

4. The invention according to claim 3 wherein said frames and coupling means are of the construction such that the spacing between said panels in the flat mating relationship is about equal to the thickness of one of said pad means in a released position whereby said pad means are compressed to their midrange modulus of elasticity.

5. The invention according to claim 1 wherein each of said panels respectively has a radius of curvature of about 36 inches, and wherein each of said pad means has a thickness of about .3 inch and a midrange modulus of elasticity of about 0.1 to 0.2 p.s.i.

References Cited

UNITED STATES PATENTS 3,153,145  10/1964  Yerkovich _____ 250—68

FOREIGN PATENTS 432,649  7/1935  Great Britain.

WILLIAM F. LINDQUIST, Primary Examiner